Aug. 21, 1962  J. D. LINDSAY  3,049,945
TRANSMISSION
Original Filed Nov. 28, 1958  5 Sheets-Sheet 1
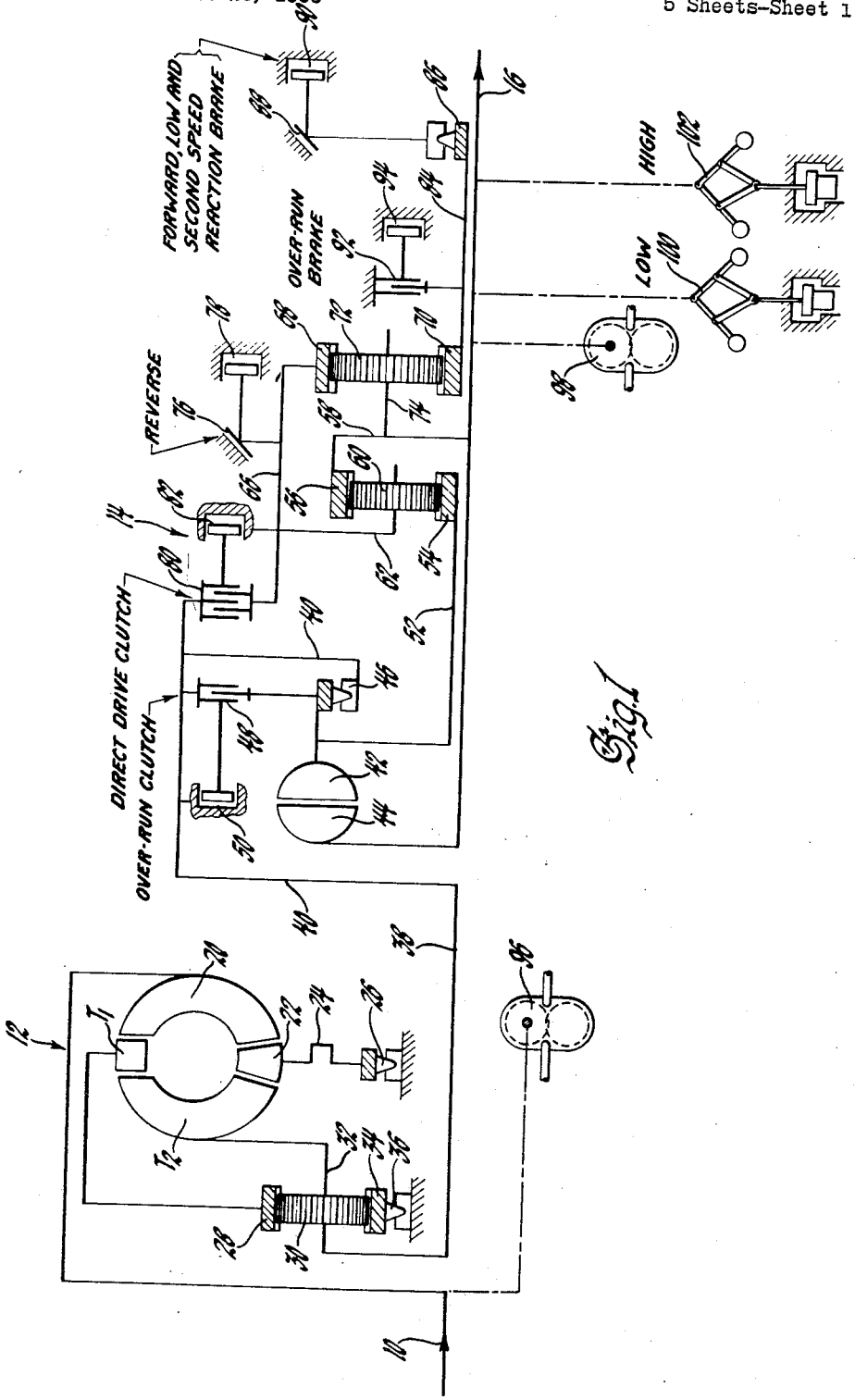

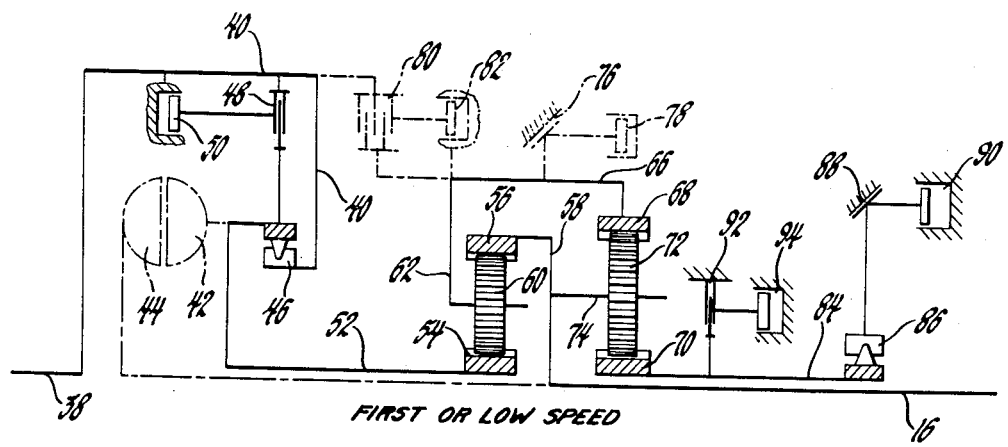
Fig. 2 — FIRST OR LOW SPEED
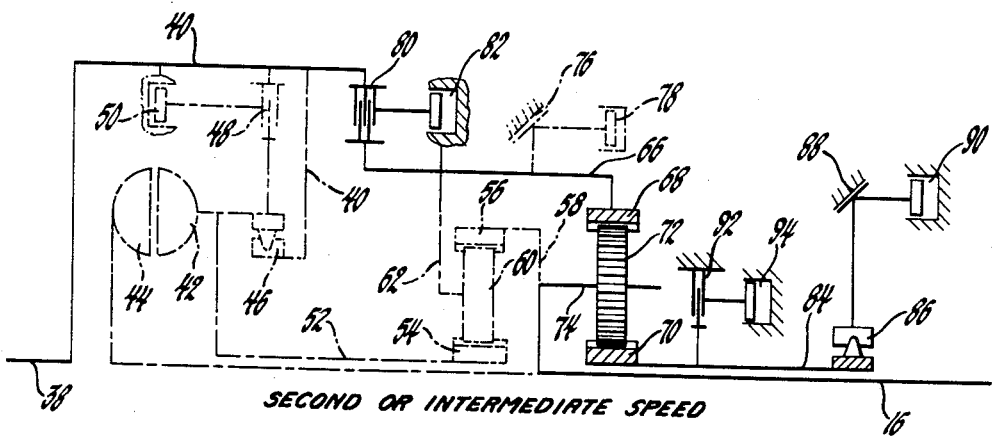
Fig. 3 — SECOND OR INTERMEDIATE SPEED Aug. 21, 1962   J. D. LINDSAY   3,049,945
TRANSMISSION
Original Filed Nov. 28, 1958   5 Sheets-Sheet 3

THIRD SPEED - DIRECT SPLIT TORQUE DRIVE

REVERSE

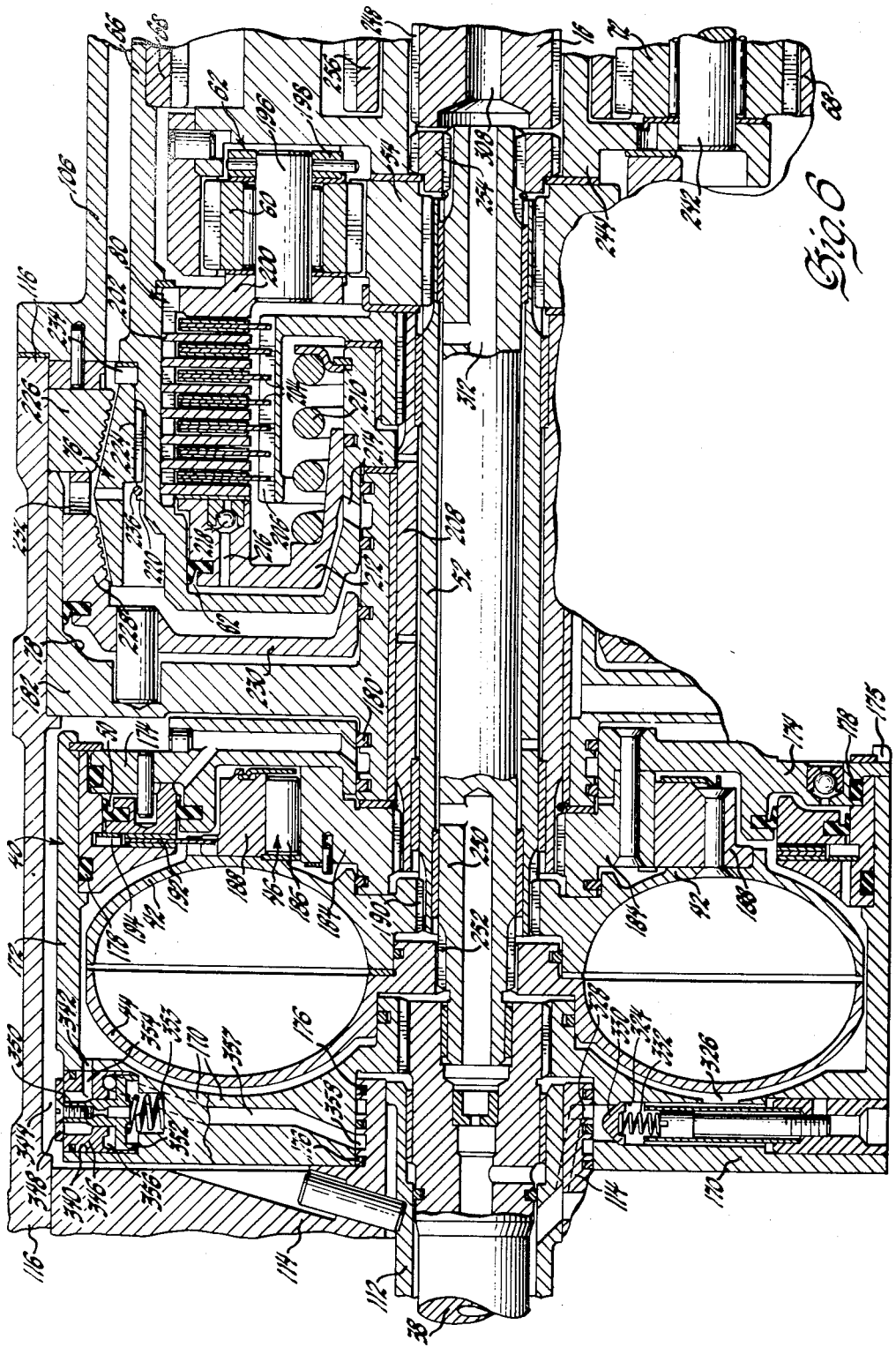

Aug. 21, 1962  J. D. LINDSAY  3,049,945
TRANSMISSION
Original Filed Nov. 28, 1958  5 Sheets-Sheet 5

INVENTOR.

BY

ATTORNEY

United States Patent Office 3,049,945
Patented Aug. 21, 1962

3,049,945
TRANSMISSION
John D. Lindsay, Birmingham, Mich., assignor to General Motors Corporation, Detroit, Mich., a corporation of Delaware
Original application Nov. 28, 1958, Ser. No. 777,112. Divided and this application Dec. 10, 1959, Ser. No. 858,741
4 Claims. (Cl. 74—759)

This is a divisional application of my application, Serial Number 777,112 filed November 28, 1958.

This invention relates to transmissions of the type in which a hydraulic torque transmitting device drives change-speed gearing which drives an output shaft at a plurality of forward speed ratios, and in reverse. It relates to novel features of construction and arrangement of the change-speed gear and to novel features of the connection between the change-speed gear and the hydrodynamic torque transmitting device.

In the drawings:

FIG. 1 is one-half of a schematic, substantially symmetrical longitudinal section showing the functional relationship of the elements of a transmission embodying one form of the invention, FIG. 2 is a diagram corresponding to FIG. 1 showing the change-speed which forms part of the transmission in first gear or low speed drive. In this and in FIGS. 3, 4 and 5, dotted lines indicate parts which are not active in the transmission of torque from the hydrodynamic torque transmitting device to the output shaft;

FIG. 3 is a diagram corresponding to FIG. 2 of the change-speed gearing in second gear or intermediate speed;

Figure 6A:
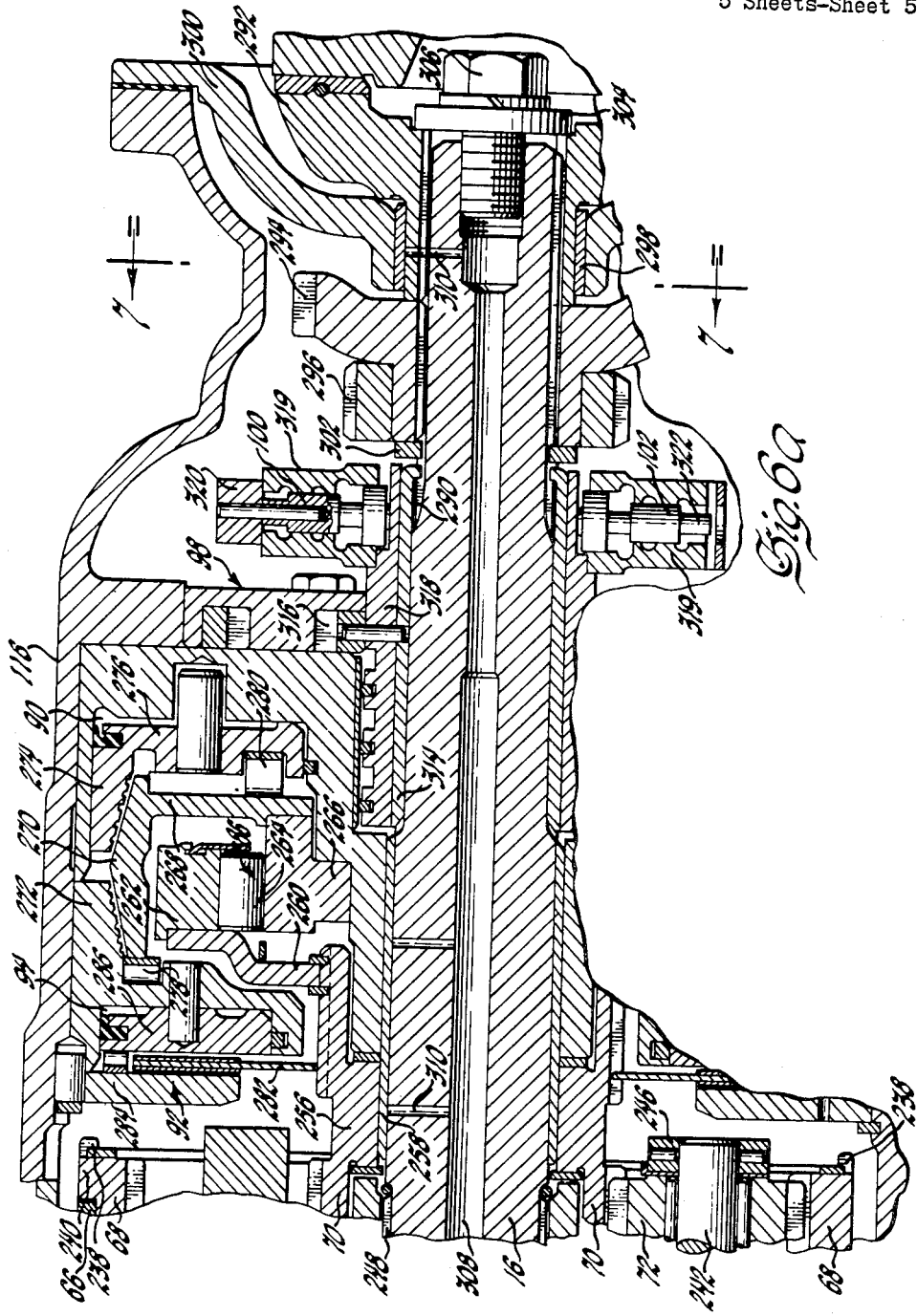

FIGS. 6 and 6A collectively form one-half of a substantially symmetrical longitudinal section of the actual construction of one form of the gearing in a transmission embodying the invention.

Referring to FIG. 1 the transmission input or driving shaft 10, which may be the crankshaft of the usual internal combustion engine, drives a hydrodynamic torque transmitting device 12 which in turn drives change-speed gearing 14 which drives an output shaft 16 which may be the propeller shaft of a conventional automobile. The hydrodynamic torque-transmitting device may be, for example, a torque converter as disclosed in British Patent 770,599, published March 20, 1957, the disclosure of which is incorporated herein by reference. In this example the torque converter has an impeller 20 driven by the engine shaft 10, a first turbine T₁ and a second turbine T₂, through which the torque transfer fluid is successively circulated, and a reaction element, stator or guide wheel 22, the blade angles of which may be adjusted by any suitable mechanism 24, and which is connected to the frame of the transmission by a one-way torque-establishing device such as brake 26 which permits the stator to rotate forward but prevents it rotating backward as is known in the art. The first turbine drives the input or ring gear 28 of a planetary gear set having planet gears 30 mounted on a carrier 32, and having a reaction sun gear 34 which is connected to the frame of a transmission by a one-way torque-establishing device or brake 36 which permits the sun gear to rotate forward but prevents it rotating backward as is known. The second turbine T₂ is connected through the carrier 32 to the torque converter output shaft 38 which forms the input or driving shaft for the gearing 14. The arrangement is such that the torque converter 12 transmits torque to the converter output shaft 38 at a ratio in respect to the torque on the input shaft 10, which ratio varies with the load on the output shaft 38. That is, when the shaft 38 is stationary or rotating at low speed which indicates high load, the torque ratio between shaft 38 and shaft 10 is high and may be of the order of three-to-one, whereas when the speed of the shaft 38 approaches the speed of the shaft 10 due to a decrease in load on the shaft 38, the torque ratio is near unity.

Shaft 38 is connected to a housing 40 which contains a fluid coupling including a turbine 44 connected to the output shaft 16 and an impeller connected by a hollow shaft 52 to a sun gear 54. The housing and the coupling may be selectively filled with oil or emptied to make the coupling effective or ineffective as will be explained. The housing 40 is connected to the sun gear by a one-way torque-establishing drive or clutch 46 to drive the sun gear forward, but permit the sun gear to overrun or rotate forward faster than the housing 40. The housing 40 may be also connected to the sun gear by an anti-overrun friction torque-establishing device or clutch 48 which may be engaged by a hydraulic cylinder 50 to prevent the sun gear from overrunning. The purpose of this arrangement is to use the one-way clutch 46 to transmit the heavy driving torque from the torque converter to the sun gear and use the light clutch 48 to prevent free wheeling when the input to the gearing is through the sun gear, as it is in low forward speed and in reverse, and to let the sun gear 54 rotate forward faster than the housing 40 when the input to the gearing is not through the sun gear 54. Preferably the clutch 48 is small and capable of transmitting only a light torque, much less than the torque required to drive the car through the one-way clutch 46.

The input sun gear 54 is a part of a front planetary gear set which includes a ring gear 56 connected by a flange 58 to the output shaft 16, and includes planet gears 60 meshing with the sun gear 54 and ring gear 56 and mounted on a carrier 62 which is connected by a drum 66 to the ring gear 68 of a second or rear planetary gear set. The rear gear set includes a reaction sun gear 70 and planet gears 72 meshing with the ring gear 68 and sun gear 70 and mounted on a carrier 74 which is connected to the flange 58 attached to the output shaft 16. The drum 66, front carrier 62 and the rear ring gear 68 may be held fast to establish reverse drive by friction torque-establishing device including a friction member 76 which can be grounded by a cylinder 78. I use the generic term torque-establishing device to refer both to clutches and to brakes, and where such clutches or brakes are of the friction type I use the term friction torque-establishing device.

Alternatively, the drum 66, carrier 62 and ring gear 68 may be connected to the fluid coupling housing 40 and to the input shaft 38 by a direct drive clutch 80 which may be set by a hydraulic cylinder 82. The rear reaction sun gear 70 is connected by a hollow shaft 84 through a one-way torque-establishing device 86 to a forward reaction friction torque-establishing device 88 which may be set by a hydraulic cylinder 90. This provides reaction torque for forward drive, as will be explained. Free-wheeling may be prevented by an overrun friction torque-establishing device 92 connected to the shaft 84, and settable by any suitable hydraulic cylinder 94.

Any suitable oil pump such as front pump 96 may be driven by the engine shaft 10 to provide a source of oil under pressure in response to rotation of the engine, for operating the controls of the transmission. Another oil pump 98 called the rear pump is driven by the output shaft 16 to provide a source of oil under pressure responsive to forward movement of the car. A low speed governor valve 100 and a high speed governor valve 102 may also be driven by an output shaft 16.

Referring to FIG. 2 to establish low or first speed drive between the torque converter output shaft 38 and the final drive shaft 16, the overrun friction torque-establishing device 48 is set, the forward reaction friction torque-establishing device 88 is set, the overrun friction torque-establishing device 92 is set, the direct drive friction torque-establishing device 80 and the reverse friction torque-establishing device 76 are released, and the fluid coupling 42—44 is emptied. The input shaft 38, through casing 40, one-way clutch 46 and shaft 52, drives the front input sun gear 54 at a speed, with relation to the speed of the engine shaft 10, that is determined by the torque converter 12. Initial resistance to movement of the car holds the shaft 16 stationary which temporarily holds the front ring gear 56 stationary to act as a reaction gear for the front planetary gear set. This causes the front carrier 62 to exert forward torque on the rear ring gear 68 and this exerts reverse torque on the sun gear 70 and forward torque on the carrier 74 and output shaft 16. Because the one-way clutch 86 and the forward reaction friction torque-establishing device 88 prevent reverse rotation of the sun gear 70, this drives the output shaft 16 forward at a reduced speed which takes advantage of the speed reductions effected by both the front and rear planetary gear sets. The overrun friction torque-establishing devices 48 and 92 prevent the car from freewheeling when the car tends to run faster than the engine would drive it.

Referring to FIG. 3, to set the gearing in second or intermediate speed, the overrun friction torque-establishing device 48 is released, fluid coupling 42—44 is emptied, the direct drive friction torque-establishing device 80 is set, the reverse friction torque-establishing device 76 is released, the overrun friction torque-establishing device 92 is set, and the forward reaction friction torque-establishing device 88 is set. The gearing input shaft 38 now drives the rear ring gear 68 through the casing of the fluid coupling 40, the direct drive friction torque-establishing device 80 and the drum 66. The rear reaction sun gear 70 is held against reverse rotation by the torque-establishing devices 86 and 88 as in low speed and this drives the carrier 74 and output shaft 16 at a speed reduction determined by the ratio of the rear planetary gear set 68—72—70, alone. The one-way clutch 46 lets the front sun gear 54 run faster than the casing 40 and carrier 62 and this lets the front planetary gearset 56—60—54 idle. Free-wheeling on overrun is prevented by the friction torque-establishing device 92.

Figure 4:
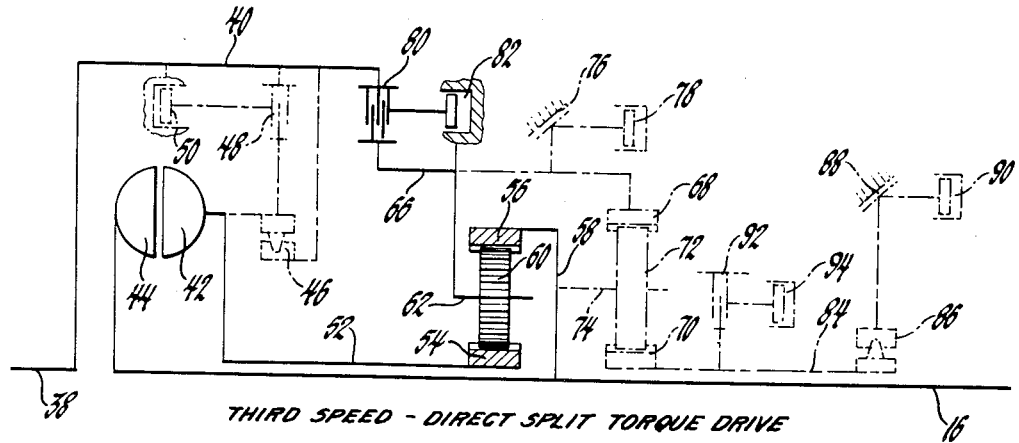
FIG. 4 shows the gearing in third speed or direct drive.

Referring to FIG. 4, provision is made for a third speed which is a direct drive with the input torque divided between mechanical drive and fluid drive. To establish third speed the fluid coupling 42—44 is filled, the overrun friction torque-establishing device 48 is released, the direct drive friction torque-establishing device 80 is engaged, the reverse friction torque-establishing device 76 is released, the overrun friction torque-establishing device 92 is released, and the forward reaction friction torque-establishing device 88 remains engaged but inactive, allowing sun gear 70 to turn forward, because of one-way device 86.

This drives the front carrier 62 by direct mechanical connection to the input shaft 38, the carrier now being the input member of the front planetary gear set. This gearset impresses forward torque on both the ring gear 56 and the sun gear 54, which latter through fluid coupling 42—44 impresses its torque on the output shaft 16. Thus the output shaft 16 is driven substantially at the speed of the input shaft 38, and the torque from the shaft 38 is divided by the front gearset into a mechanical component through ring gear 56 and a hydraulic component through sun gear 34. The ratio of the components is established by the ratio of the number of teeth in the ring gear to the number of teeth in the sun gear, the proportion through the sun gear being the smaller, as is known. Since the ring gear 56 and the turbine 44 necessarily turn at the speed of the shaft 16, and the sun gear 54 runs faster than the ring gear 56, the sun gear drives the impeller 42 faster than the speed of the casing 40, as permitted by the one-way clutch 46.

Figure 5:
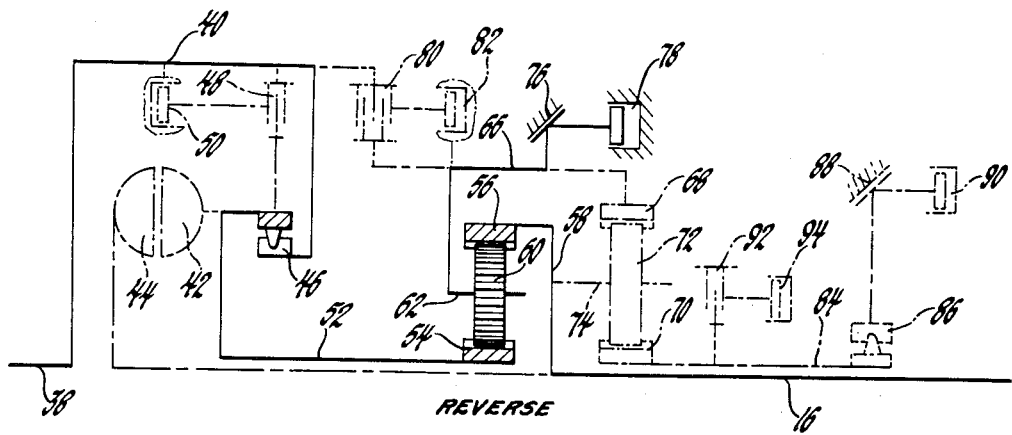
FIG. 5 shows the gearing in reverse.

Referring to FIG. 5 for reverse drive the overrun friction torque-establishing device 48, the direct drive friction torque-establishing device 80, the overrun friction torque-establishing device 92 and the forward reaction friction torque-establishing device 88 are all released, the fluid coupling 42—44 is emptied, and reverse friction torque-establishing device 76 is set. The torque converter output shaft 38 now drives the shaft 52 through the one-way clutch 46, and because the friction torque-establishing device 76 holds the carrier 62, the sun gear 54 drives the ring gear 56 backward which drives the output shaft 16 backward at low speed ratio.

Structure

As shown at the left of FIG. 6 the rear or right end of the torque converter output shaft 38 is keyed or splined to a front radial flange 170 formed integral with an outer cylindrical drum 172 which is keyed to a rear radial flange 174 as by teeth 175 shown at the bottom of the drawing. The flanges and drum together constitute the fluid coupling casing 40 which is at times to be filled with oil under pressure. In order to contain the oil in the casing the front flange 170 has a rotating seal connection 176 with a sleeve forming part of the stationary wall 114 and the rear flange 174 is sealed to the drum 172 by a gasket 178 and has a rotating sealing connection 180 with a flange on a stationary wall 182.

The front flange 170 contains control valves, which will be described, for admitting and releasing oil from the casing 40.

As shown in the lower half of the drawing, the rear flange 174 is riveted to the inner race 184 of the one-way clutch 46 whose rollers or sprags 186 engage a cam ring or outer race 188 of known form riveted to the impeller 42 of the fluid coupling 42—44. The impeller is splined at 190 to the gearing input shaft 52. The one-way clutch 46 is arranged so that forward rotation of the casing 40 drives the impeller, but the impeller can rotate forwardly faster than the casing 40. The impeller 42 and outer race 188 are also splined to the driving plate 192 of the over-run clutch 46 which may be set by the piston 194 when oil under pressure is admitted to the cylinder 50. This locks the impeller to the casing 40 so that the car can drive the engine which thus serves to brake the car.

The gearing input shaft 52 is keyed at its rear or right end, as FIG. 6 is seen, to the front input sun gear 54 which meshes with the planets 60 journalled on spindles 196 forming part of the carrier 62 and supported in a rear cheek plate 198 and a front cheek plate 200 keyed to the drum 66 and splined to the driven plates 202 of the direct drive clutch 80. The driving plates 204 of the clutch 80 are splined to a clutch hub 206 splined to the rear end of a hollow shaft 208, the front end of which is splined to the rear flange 174 of the fluid coupling casing 40 so that the driving plates 204 are driven by the torque converter output shaft 38. The main clutch 80 is normally disengaged by a release spring 210 which constantly urges to the left a clutch apply piston 212 which can be moved to the right to engage the clutch by the pressure of oil admitted to the cylinder 82 through a control passage 214 near the center of the cylinder, formed integral with the drum 66. In order to insure release of the clutch and prevent the building up of centrifugal pressure in the chamber 82 when the pressure in the passage 214 is released, the piston is provided near its rim with the release passage 216 and a centrifugal dump valve 218 which may be constructed as shown in the U.S. Patent to Harold Fischer 2,740,512, the disclosure of which is included herein by reference.

On the outer surface of the drum 66 are splines 220 which engage splines on the driven drum 224 of the reverse friction torque-establishing device 76 which is of double frusto-conical form and is placed between a frusto-conical ground shoe 226 fixed to the casing 116 and a frusto-conical apply shoe 228 forming part of a piston 230 doweled to the casing 116 and sliding in the cylinder 78 formed in the wall 182 fixed to the casing. The ground shoes 226 and 228 are urged apart by a release spring 232 and the driven drum 224 is urged out of contact with both shoes by a second release spring 234 which urges the drum 224 against a stop 236, except when fluid under pressure is admitted to the cylinder 78 to establish reverse drive by holding the carrier 62, as explained above.

As shown at the right of FIG. 6 and at the left of FIG. 6A the drum 66 is keyed to the ring gear 68 by teeth 238 on the drum 66 and intermeshing teeth 240 on the ring gear 68. The ring gear 68 engages the planet gears 72 journaled on spindles 242 supported in a front cheek plate 244 (FIG. 6) and a rear cheek plate 246 (FIG. 6A) which plates form parts of the carrier 74 connected to the output shaft 16 by splines 248.

As shown in FIG. 6 the turbine 44 of the fluid coupling 42—44 is connected to the output shaft 16. For mechanical convenience this connection is formed by a shaft 250 secured at its front end to the turbine 44 by a spline 252, and splined at its rear end to the interior of a ring 254, the outside of which is splined to the front cheek plate 244 of the carrier 74 and so is connected to the output shaft 16. The planet gears 72 mesh with the reaction ring gear 70 which is formed integral with a short hollow shaft 256 rotatably supported on the output shaft 16 by a bearing sleeve 258. At its rear end the shaft 256 is splined to a flange 260 riveted to the outer race 262 of the one-way device 86 having sprags or rollers 264 running on an inner race 266 riveted to a flange 268 integral with a double frusto-conical drum 270 disposed between frusto-conical ground shoes 272 and 274 non-rotatably mounted in the casing 166. Preferably, the ground shoe 274 is formed integral with the piston 276 in the fluid pressure cylinder 90 to which oil under pressure may be admitted to engage the brake against the force of the return springs 278 and 280 and thus hold the inner race 266 to prevent reverse rotation of the sun gear 70.

Also, splined to the tube 256 forming part of the sun gear 70 is the driven plate 282 of the overrun friction torque-establishing device 92 which includes a stationary disc 284 secured to the casing and a piston 286 operating in the cylinder 94 to which oil under pressure may be admitted to hold the sun gear 70 positively against rotation in either direction.

The rear end of the output shaft 16, as shown at the right of FIG. 6A has a long spline 290 for securing an output drive connection such as the universal joint 292 and the parking gear or lock 294 and speedometer driving gear 296. The universal joint 292 may be supported in a bearing 298 in a bearing container 300 secured to the casing 166. The speedometer gear, parking lock and universal joint are all secured axially to the drive shaft 16 between a stop or snap ring 302 and a washer 304 held by a bolt 306. Shaft 16 is provided with a central bore 308 forming a lubricating supply duct connecting with various lubricating passages 310 and registering with a similar bore 312 in shaft 250, FIG. 6.

The output shaft 16 also carries a drive sleeve 314 interlocked with the spline 290 and pinned to the driving gear 316 of the rear pump 98 and pinned to a governor drive sleeve 318 to which is fixed a governor casing 319 which carries the low speed governor valve 100 and the high speed governor valve 102. The arrangement and construction of the governor may be as shown in the U.S. Patent to Thompson 2,204,872, June 18, 1940, the disclosure of which is included herein by reference. As is known the governor constitutes two sources of control oil, the pressure of which is measured by the speed of the output shaft. The low speed governor valve includes a relatively heavy centrifugal weight 320 which increases the control pressure rapidly as the car speed increases and the high speed governor valve 102 has a relatively light centrifugal weight 322 which provides a slower increase in pressure in response to rising car speed, as is known.

As shown in the lower part of FIG. 6 the front flange 170 of the fluid coupling housing 40 has a bore 324 which can fill the casing 40 and fluid coupling 40—42 through an opening 326 from an oil supply passage or gland 328 in the stationary wall 114. The bore 324 contains an inlet valve 330 urged closed by a spring 332 to prevent communication between the gland 328 and the interior of the fluid coupling. Whenever the fluid coupling is to be filled, oil under pressure is supplied by the control system to the gland 328, the pressure opens the valve against the force of spring 332 and oil flows into the coupling. The spring 332 has sufficient force to hold the valve closed against centrifugal force.

As shown in the upper half of FIG. 6 the front flange 170 also has an outlet bore 340 leading from a vent passage 342 of the fluid coupling to the space 344 surrounding the fluid coupling casing 40 which communicates with the usual sump forming part of the casing 116, which is substantially at atmospheric pressure, as is known. The outlet bore 340 contains a fixed valve sleeve 346 which guides a reciprocal valve assembly, including valve cap 348 mounted on a stem 350 integral with a piston 352 slidable in the sleeve. A spring 353 normally urges the valve outward, that is upward as FIG. 6 is seen so that the valve cap vents the coupling to the space 344 through the passage 354 matching the vent opening 342. The space between the sleeve 346 and the piston 352 forms a valve closing chamber 356 which is in communication with the passage 357 in the flange 170 which in turn is in communication with a gland 358 in the wall 114 to which oil under pressure may be admitted from any suitable control system (not shown) to urge the piston 352 inwardly against the spring to close the exhaust valve. Whenever the fluid coupling is to be filled oil under pressure is supplied from the control system to the gland 358 to close the exhaust valve 348 and oil under pressure is admitted to the inlet passage 326 to open the inlet valve 330 and supply fluid to fill the coupling. In order to empty the fluid coupling, the supply of fluid to passages 326 and 358 is interrupted. The spring 352 then opens the vent valve and the fluid is drained from the coupling by centrifugal force. Preferably a number of inlet valves and exhaust valves like those shown in FIG. 6 are disposed about the circumference of the flange 170 in order to effect rapid filling and emptying of the coupling.

I claim:

1. A power transmission comprising in combination, an output shaft; a planetary gearset which drives the output shaft including an input gear, a reaction gear, and a planet gear meshing with the input and reaction gears and journalled on a carrier which is connected to the output shaft; a one-way torque-establishing device which prevents reverse rotation of the reaction gear while permitting forward rotation thereof; another planetary gearset which drives said input gear including an input gear, a reaction gear and a planet gear journalled on a carrier which is connected to the first-mentioned input gear, the second-mentioned reaction gear being connected to the output shaft; power input means; a one-way torque-establishing connection between the input means and the second-mentioned input gear; means which selectively connects and disconnects the power input means and the first-mentioned input gear; and means which selectively establishes and interrupts a torque-transmitting connection between the second input gear and the output shaft.

2. A power transmission comprising in combination, an output shaft; a planetary gearset which drives the output shaft including an input gear, a reaction gear, and a planet gear meshing with the input and reaction gears and journalled on a carrier which is connected to the output shaft; a one-way torque-establishing device which prevents reverse rotation of the reaction gear while permitting forward rotation thereof; another planetary gearset which drives said input gear including an input gear, a reaction gear and a planet gear journalled on a carrier which is connected to the first-mentioned input gear, the second-mentioned reaction gear being connected to the output shaft; power input means; a one-way torque-establishing connection between the input means and the second-mentioned input gear; means which selectively connects and disconnects the power input means and the first-mentioned input gear; and a fluid coupling for at times drivingly connecting the second input gear and the output shaft.

3. A power transmission comprising in combination, an output shaft; a planetary gearset which drives the output shaft including an input gear, a reaction gear, and a planet gear meshing with the input and reaction gears and journalled on a carrier which is connected to the output shaft; a one-way torque-establishing device which prevents reverse rotation of the reaction gear while permitting forward rotation thereof; another planetary gearset which drives said input gear including an input gear, a reaction gear and a planet gear journalled on a carrier which is connected to the first-mentioned input gear, the second-mentioned reaction gear being connected to the output shaft; power input means; a one-way torque-establishing connection between the input means and the second-mentioned input gear; means which selectively connects and disconnects the power input means and the first-mentioned input gear; and a fluid coupling for drivingly connecting the second input gear and the output shaft when said fluid coupling is charged with liquid.

4. A power transmission comprising in combination, an output shaft; a planetary gearset which drives the output shaft including an input gear, a reaction gear, and a planet gear meshing with the input and reaction gears and journalled on a carrier which is connected to the output shaft; a one-way torque-establishing device which prevents reverse rotation of the reaction gear while permitting forward rotation thereof; another planetary gearset which drives said input gear including an input gear, a reaction gear and a planet gear journalled on a carrier which is connected to the first-mentioned input gear, the second-mentioned reaction gear being connected to the output shaft; power input means; a one-way torque-establishing connection between the input means and the second-mentioned input gear; means which selectively connects and disconnects the power input means and the first-mentioned input gear; and a fluid coupling for drivingly connecting the input gear and the output shaft and means for selectively charging said coupling with liquid and emptying liquid from the coupling.

References Cited in the file of this patent

UNITED STATES PATENTS

| | | |
|---|---|---|
| 2,395,459 | Carnagua | Feb. 26, 1946 |
| 2,531,996 | Voytech | Nov. 28, 1950 |
| 2,593,568 | Kelbel | Apr. 22, 1952 |